(12) United States Patent
Kerin et al.

(10) Patent No.: US 7,530,604 B2
(45) Date of Patent: May 12, 2009

(54) NON-SERVICEABLE FLUID COUPLING

(75) Inventors: Jim Kerin, Gross Pointe Woods, MI (US); Stephen H. Gunderson, Marine City, MI (US); Ray Brauckmiller, Clinton Township, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 69 days.

(21) Appl. No.: 11/748,774

(22) Filed: May 15, 2007

(65) Prior Publication Data

US 2008/0284164 A1  Nov. 20, 2008

(51) Int. Cl.
F16L 33/00  (2006.01)

(52) U.S. Cl. .................... 285/256; 285/382; 285/374

(58) Field of Classification Search ................ 285/256, 285/382, 374
See application file for complete search history.

(56) References Cited

U.S. PATENT DOCUMENTS

| | | | | |
|---|---|---|---|---|
| 2,028,316 A * | 1/1936 | Brunner | | 285/256 |
| 2,090,251 A * | 8/1937 | Cowles | | 285/382 |
| 2,113,313 A * | 10/1938 | Weatherhead, Jr. | | 285/256 |
| 3,433,505 A * | 3/1969 | Weatherhead | | 285/256 |
| 3,442,537 A * | 5/1969 | Mack et al. | | 285/256 |
| 3,924,883 A * | 12/1975 | Irving | | 285/256 |
| 4,513,489 A * | 4/1985 | Sugiyama et al. | | 285/256 |
| 4,650,223 A * | 3/1987 | Miyazaki et al. | | 285/256 |
| 4,776,616 A * | 10/1988 | Umehara et al. | | 285/382 |
| 5,037,142 A * | 8/1991 | Helping | | 285/256 |
| 5,273,323 A | 12/1993 | Calmettes et al. | | |
| 5,769,465 A * | 6/1998 | Schultz et al. | | 285/328 |
| 5,829,795 A * | 11/1998 | Riesselmann | | 285/256 |
| 5,931,510 A * | 8/1999 | Mathew et al. | | 285/319 |
| 6,079,750 A | 6/2000 | Kacines | | |
| 6,082,784 A * | 7/2000 | Fukaya | | 285/382 |
| 6,164,704 A | 12/2000 | Sausner | | |
| 6,419,278 B1 | 7/2002 | Cunningham | | |
| 6,447,020 B1 * | 9/2002 | Kacines et al. | | 285/256 |
| 6,857,667 B2 | 2/2005 | Malone | | |
| 6,997,485 B2 * | 2/2006 | Souvatzidis | | 285/256 |
| 7,178,836 B2 * | 2/2007 | Hoff et al. | | 285/256 |
| 7,387,317 B2 * | 6/2008 | Chisnell | | 285/256 |
| 2005/0285392 A1 | 12/2005 | Brauckmiller et al. | | |

FOREIGN PATENT DOCUMENTS

| | | | |
|---|---|---|---|
| JP | 04165190 A | * | 6/1992 |
| JP | 04296278 A | * | 10/1992 |
| JP | 04341682 A | * | 11/1992 |

* cited by examiner

*Primary Examiner*—David E Bochna
(74) *Attorney, Agent, or Firm*—Leydig, Voit & Mayer, Ltd.

(57) ABSTRACT

A non-serviceable coupling includes a body with a tube receiving end bore and a hose receiving end bore. The tube includes a radial upset with a seal and spacer supported on the tube. The outer cylindrical surface of the tube is press fit into the reduced diameter bore at the tube receiving end to connect the coupling to the tube. The coupling body is crimped to the tube and to the hose to secure the hose and tube to the coupling. The tube is axially restrained between the crimp and an annular wall in contact with the tube end. In another embodiment, a second seal, outward of the upset is employed to prevent entry of contaminants.

17 Claims, 4 Drawing Sheets

NON-SERVICEABLE FLUID COUPLING

BACKGROUND

The invention relates to a fluid connector coupling that joins a flexible hose to a metallic tube. Commonly known as a non-serviceable joint, it has application to automotive hydraulic brake systems. This design configuration could be used in a wide variety of fluid dynamic/static applications. It could also be used in other fluid systems such as automotive air conditioning systems and in refrigeration systems. The connector coupling is considered to be a non-serviceable joint because the tube is locked to the connector coupling.

The interface between a tube and hose commonly used today for high pressure brake and other fluid system applications requires a machined tube end configuration. The machined end form design can be seen in U.S. Pat. No. 6,419,278. To make the end form in this latter disclosure the tube must be manipulated several times to produce an end form to join the metal tube to the hose.

Another non-serviceable joint is disclosed in U.S. Patent Application Publication 2005/0285392. It includes a separate insert sealed within the end of the metal tube that serves as the central support member within the flexible hose.

The present invention relates to a connector coupling used to secure a flexible hose and metal tube and provide a leak free joint between the hose and the metal tube. The connector coupling consists of two ends. Each end of the connector coupling is configured to retain the associated hose or tube interface. Each end of the connector coupling immobilizes the tube, or hose by means of a crimp joint.

The coupling of the invention:
Allows a metal tube to interface with an elastomeric hose without using a machining operation on the tube end form.
Reduces side load movement of the end form to reduce seal wear.
Eliminates need for a Teflon back-up ring between the O-ring seal and the outer spacer. The outer spacer acts as the back-up ring in this design.
With the male tube end form press fitted against the bearing wall of the coupling it reduces the amount of pressure to the O-ring.
Seals out contaminants to protect the seal and reduce effects of corrosion.

DESCRIPTION OF ILLUSTRATED EMBODIMENTS

Figure 2:
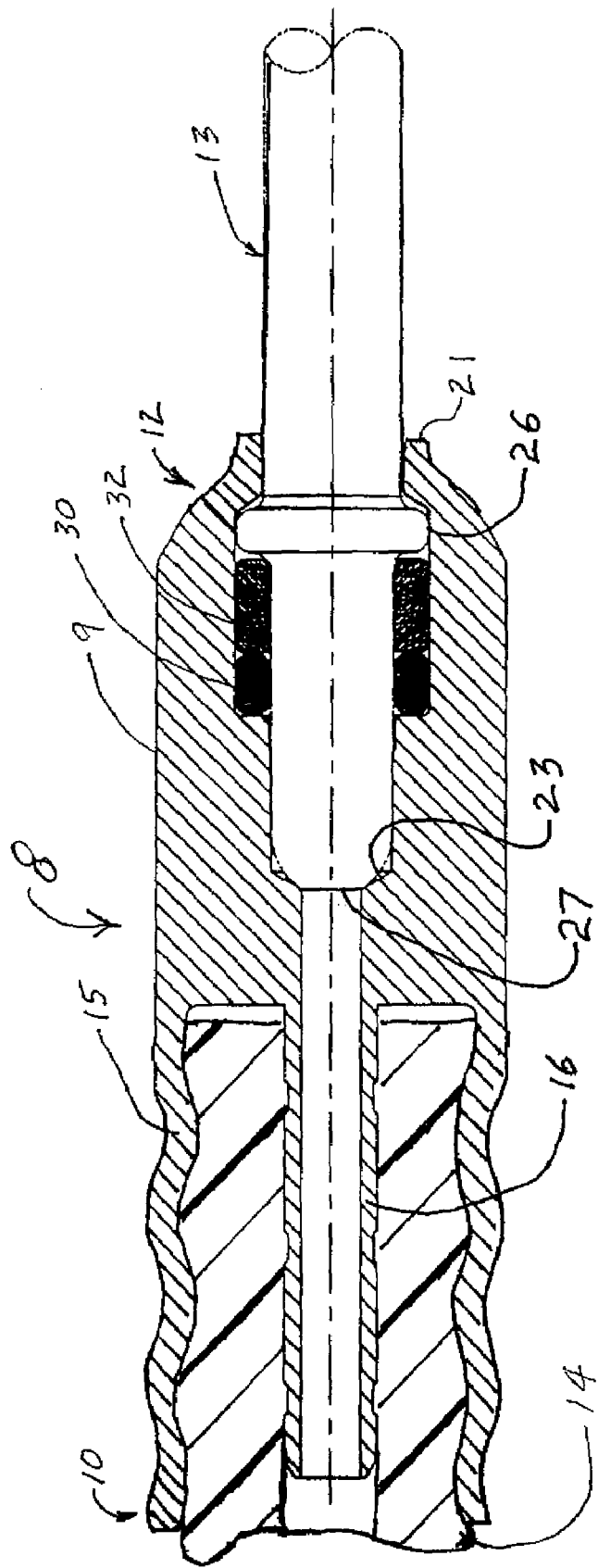
FIG. 2 is a sectional side view of the connector coupling of FIG. 1 showing the shell of the connector coupling crimped to a tube and to a hose.

A connector coupling assembly generally designated 8, is illustrative of the present invention. It includes a shell or body 9 having two ends, a hose end designated 10 and a tube end designated 12. As seen in FIG. 2, hose end 10 of connector coupling 9 receives and secures a flexible polymeric or rubber hose 14. The tube end 12 receives and secures a rigid metal tube 13.

Hose end 10 includes an outer, axially extending cylindrical wall or crimp shell 15 surrounding a central tubular member or barrel 16. An axially extending annular bore 11 is defined between shell 15 and barrel 16. Central tubular member or barrel 16 includes an internal passage 17 that provides fluid communication between the hose 14 and tube 13.

Hose 14 is positioned within the bore 11 with the central tubular member or barrel 16 positioned within the inner hollow passage of the hose. Central tubular member 16 is provided with a plurality of reduced diameter recessed ring portions 19. These reduced diameter ring portions 19 cooperate with the surface of the internal passage of the hose to retain the joint between the coupling and hose on crimping of the outer annular cylindrical wall 15.

Conventional crimping technology is employed to secure the connector coupling 8 to the hose. As illustrated in FIG. 2, the axially extending cylindrical wall or shell 15 of connector coupling 8 is crimped onto the hose in a conventional fashion using conventional crimping equipment. The hose 14 is compressed against the hollow central tubular member or barrel 16, so as to circumferentially and radially deform the malleable material of the connector coupling cylindrical wall 15 onto the hose. The central tubular member or barrel 16 supports the crimp from within the internal passage of hose 14.

The tube 13 to be secured to the hose 14 is a metal tube having an outer cylindrical surface 27 and an enlarged radially directed flange or upset 26 formed at a given distance from its free end 28. The tube may, as illustrated, be coated with a polymeric outer layer 29 such as nylon that provides impact, corrosion and other resistance usually important to automotive applications. That coating is stripped from the tube to provide a metal surface from the free end 28 to just outward of the upset 26. The tube 13 is hollow, and when connected to the connector coupling 8 is in fluid communication with the internal passage 17 of central tubular member or barrel 16 of hose end 10 to provide a fluid path between the tube 13 and hose 14.

The tube end 12 of connector coupling body 9 is designed to interface with metal tube 13. Tube end 12 of the connector coupling body 9 has a reduced diameter cylindrical wall 21 at end 12. That is, the portion of body 9 near the tube receiving end has a smaller outer diameter than the remainder of the body. The body 9 defines an axially extending passage or tube receiving bore 18 having an enlarged diameter bore portion 20 at the tube receiving end 12 and a reduced diameter bore portion 22 inward of the enlarged diameter portion 20. Inner, or inward as used here means inside the body 9, spaced from the tube end 12.

Reduced diameter portion 22 is in communication with the hollow internal passage 17 of central tubular member. The reduced diameter portion 22 is of a diameter slightly smaller than the outer cylindrical surface of tube 13 as is discussed in detail below. Axially innermost annular wall 23 is the terminus of internal passage or bore 18. An annular radial wall 24 separates the enlarged, and reduced diameter portions 20 and 22 of bore 18. The axial length of the bore 18 from tube end 12 to innermost annular wall 23 is larger than the distance from the free end 28 of tube 13 to the surface 29 of the tube beyond upset 26.

The outer cylindrical surface 27 of tube 13 is disposed within the reduced diameter portion 22 of tube receiving bore 18 of connector coupling 8. This outer surface is piloted in reduced diameter bore portion 22. Free end 28 of tube 13 abuts the axially innermost annular wall 23. When so positioned the reduced diameter outer wall overlies the surface 27 of the tube 13 beyond upset 26.

The upset 26 is received within enlarged bore portion 20 in spaced relation to annular radial wall 24 and defines a seal or gland pocket between the wall 24 and upset 26.

A seal member in the form of an elastomeric O-ring seal 30 is positioned surrounding the outer cylindrical surface 27 of tube 13, spaced from the upset 26. The outer and inner diameters of the O-ring seal are sized to provide a fluid tight seal with the outer cylindrical surface 27 of the tube and the inner cylindrical surface of enlarged bore portion 20.

An outer spacer 32 is positioned surrounding the outer cylindrical surface 27 of the tube 13 between the O-ring seal 30 and the upset 26. It is annular, with an inward facing annular surface 33 and outward facing annular surface 34. It is sized to be slidably received on the outer surface of the tube and within the enlarged bore portion 20.

Spacer 32 is made of a rigid material. It may be a resin or it may be metallic. It is sized such that it contains O-ring 30 between the forward annular surface 33 and the annular radial wall 24. Rearward annular surface 34 rests against upset 26.

The outer spacer 32 is fitted into the enlarged bore portion 20 and further defines the O-ring gland pocket area. The outer spacer defines and maintains the outermost O-ring gland area, defines the innermost radial wall that abuts with the lead face of the end form or upset 26, and is a bearing support surface for the male tube end form.

The tube is first pre-assembled by placement of the spacer 32 and O-ring seal 30 onto the outer cylindrical surface 27 of tube 13. The tube free end 28 is then inserted into the tube receiving bore 18 until the free end 28 contacts the axially innermost annular wall 23. The outer cylindrical surface 27 of the tube 13 is piloted within the reduced diameter portion 22 of the bore 18 and the O-ring seal 30 is in fluid tight contact with the outer cylindrical surface 27 of the tube 13, the inner surface of the enlarged bore portion 20 of the tube receiving bore 18, the annular radial wall 24 in bore 18 and the forward annular surface 33 of the outer spacer 32.

The body 9 of the connector coupling 8 adjacent to the end 12 is defined by transition to a reduced diameter wall portion 21. After insertion of tube 13 into tube receiving bore 18, the reduced diameter cylindrical wall portion 21 is crimped onto the tube 13 by conventional crimping methods to secure the tube 13 within the tube receiving bore 18. During crimping, the bending moment develops from the smallest cross section outward away from the tube upset 26. The thinner wall portion 21 relative to the thicker shell or body 9 allows the material to flow behind the upset 26 locking it into position without placing undue pressure or stress on the outer surface of the upset.

The connector coupling reduced diameter cylindrical wall portion 21 at tube receiving end 12 is crimped radially, closing the connector coupling reduced diameter cylindrical wall portion 21 onto the tube. The wall portion 21 of the connector coupling 9 is forced downward onto the tube, and locks the male tube including upset 26 within the tube receiving bore 18. The male tube is immobilized within the coupling bore 18 because it is captured between the radial crimp of reduced diameter cylindrical wall portion 21 and the innermost annular wall 23 which is in contact with the tube end 28. The tube is locked into position not allowing the connector coupling or tube to rotate about the longitudinal axis or move axially. This connection also prevents volumetric expansion at that joint, a condition previously experienced in high pressure brake lines. The crimp is also designed to seal onto the polymeric layer 29 on the tube 13 to prevent entry of contamination between the wall portion 21 and the outer surface of tube 13.

Another important relationship is that the reduced diameter bore portion 22 of tube receiving bore 18 is sized so as to create an interference fit with the outer cylindrical surface 27 of tube 13. That is, the diameter of reduced diameter bore portion 22 of tube receiving bore 18 is a few thousandths of an inch smaller than the outer diameter of the cylindrical surface 27 of the tube 13. To assemble the tube 13 into the connector coupling 9 it is necessary to apply an axial force to overcome the interference fit. The coupling 8 is secured to the end of the tube 13 by the interference fit of the outer cylindrical surface 27 within reduced diameter bore portion 22.

The foregoing relationship between the inner surface of the reduced diameter bore portion 22 and the outer diameter of the outer cylindrical surface 27 of tube 13 allows for extreme bearing loads and supports the crimped wall of the coupling to manage radial loading to the O-ring seal 30. The male tube cylindrical surface 27 press fitted within bore 22 also minimizes the amount of fluid pressure to the O-ring 30, minimizing the axial load on the O-ring against radial surface 33 of spacer 32.

Figure 1:
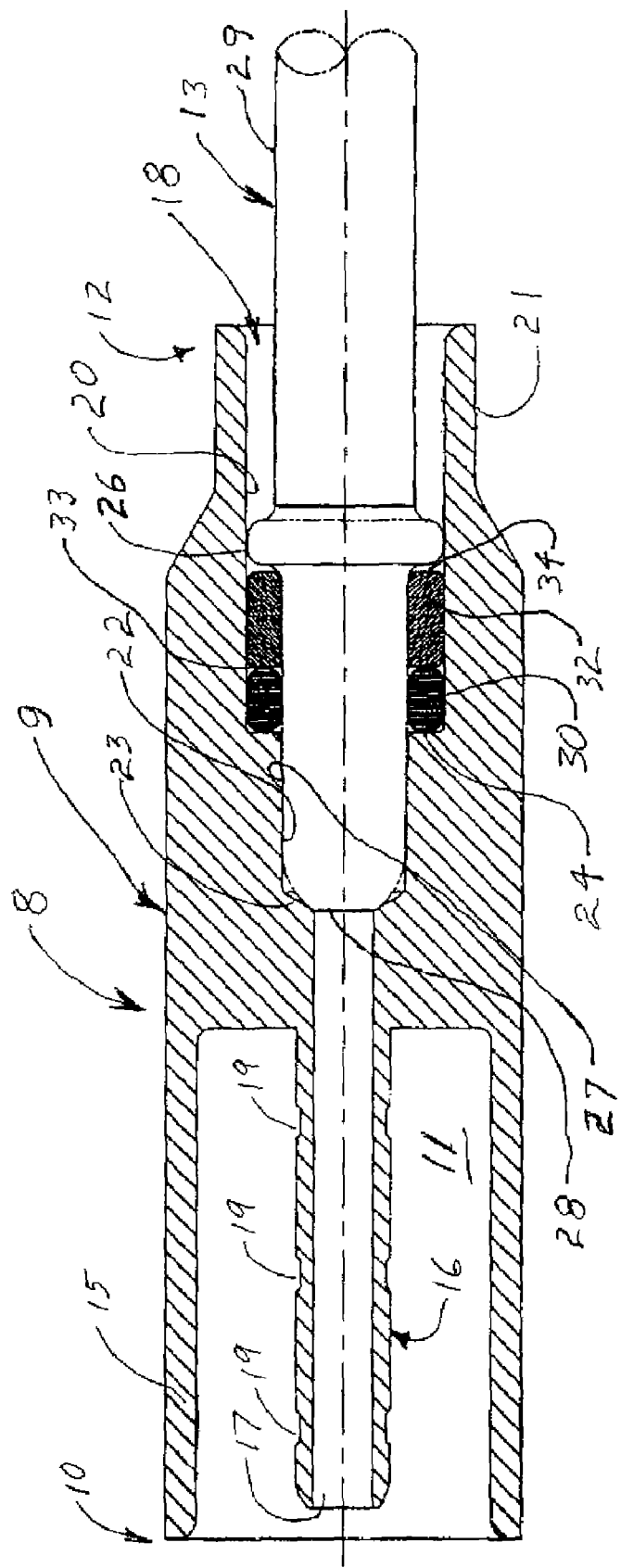
FIG. 1 is a sectional side view of a connector coupling with a tube inserted and embodying the present invention.
Figure 3:
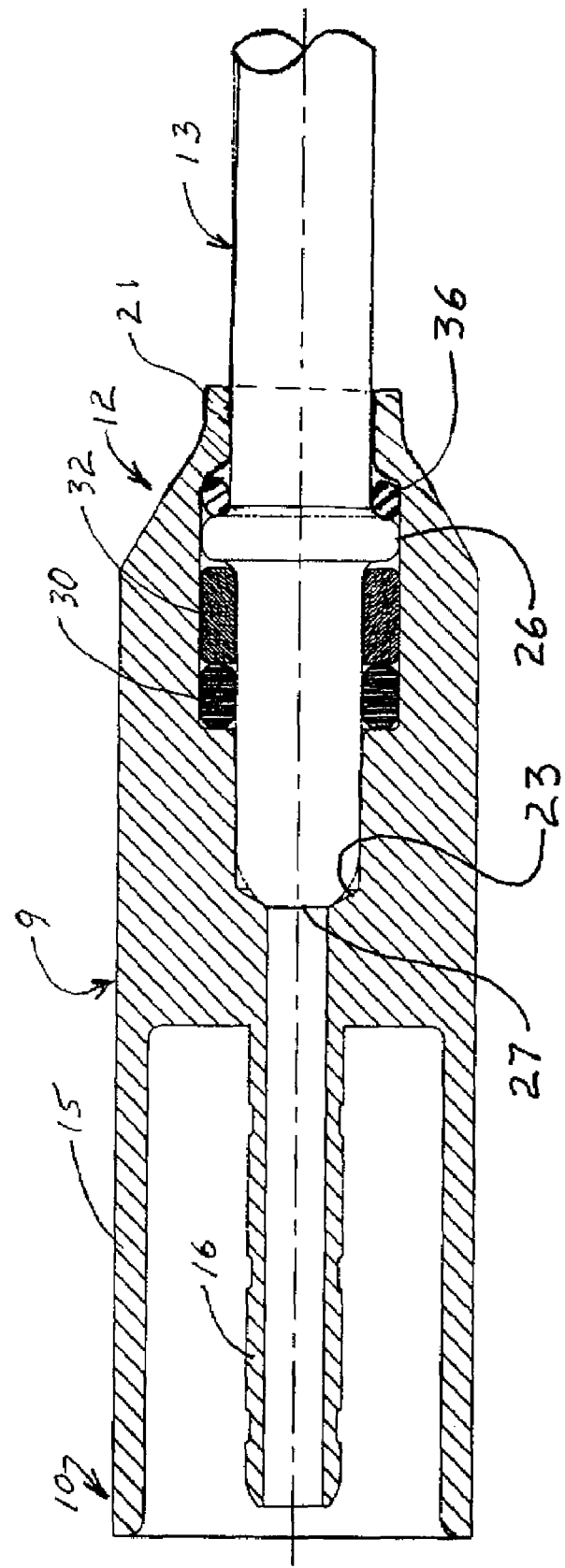
FIG. 3 is a sectional side view of a modified form of the connector coupling of FIGS. 1 and 2 also embodying the present invention.
Figure 4:
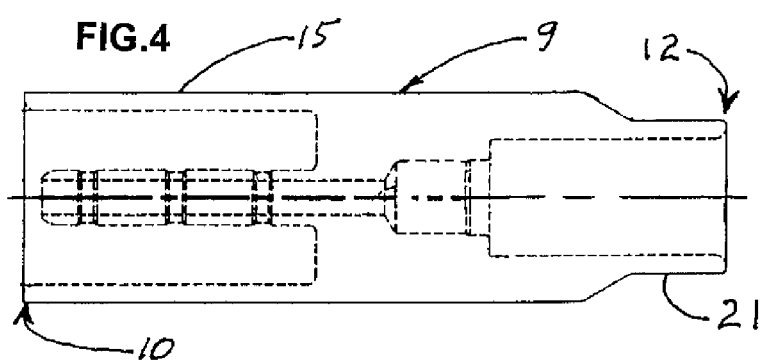
FIG. 4 is a side view of the connector coupling body.
Figure 5:
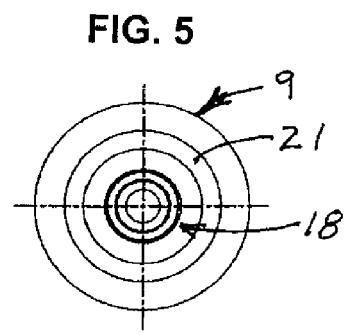
FIG. 5 is an end view of the connector coupling body of FIG. 4.
Figure 6:
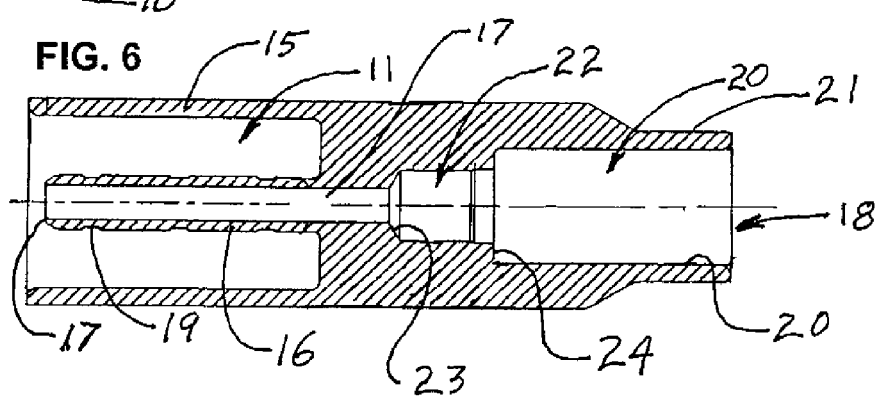
FIG. 6 is a sectional side view of the connector coupling body of FIG. 4.
Figure 7:
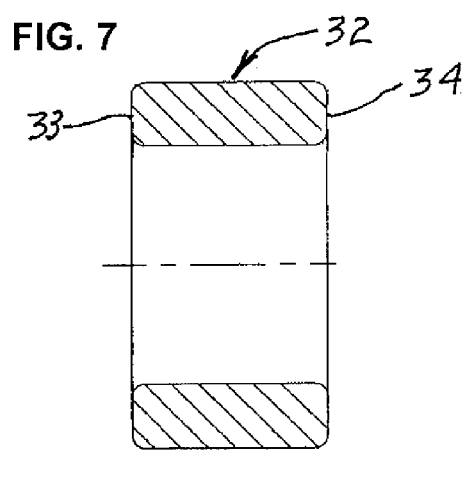
FIG. 7 is a sectional side view of the outer spacer.
Figure 8:
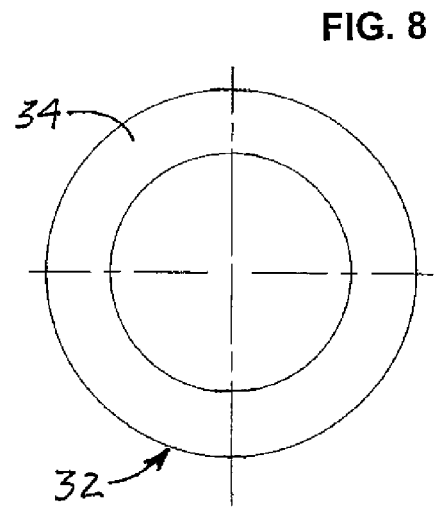
FIG. 8 is an end view of the outer spacer of FIG. 7.

Turning now to the embodiment of FIG. 3, an arrangement is provided similar to that of the embodiments of FIGS. 1 and 2 with an additional seal member incorporated into the assembly. The seal member in the form of an elastomeric O-ring is located on the outward side of upset 26. The O-ring 36 surrounds the tube outward of upset and is compressed by the crimp of reduced diameter cylindrical wall portion 21. When reduced diameter cylindrical wall portion 21 of body 9 is crimped onto the tube 13, O-ring 36 seals against the outer surface of the tube and improves resistance to entry of contaminants or corrosive fluids.

Various features of the invention have been shown and described in connection with the attached drawings. It must be understood, however, that modifications may be made without departing from the scope of the invention.

What is claimed is:

1. A connector coupling connecting a flexible hose to a rigid metal tube in fluid communication comprising:
    a hollow flexible hose having an end;
    a rigid metallic tube having a free end, an upset spaced from said free end, and an outer cylindrical surface extending between said free end and said upset;
    said coupling having a body comprising:
    a hose end defining a hose receiving bore,
    a tube end defining a tube receiving bore,
    a hollow barrel in said hose receiving bore,
    said tube receiving bore including,
        an enlarged diameter bore portion adjacent said tube receiving end, a reduced diameter bore portion inward of said enlarged diameter bore portion and in fluid communication with said hollow barrel, a radial annular wall separating said reduced diameter bore portion and said enlarged diameter bore portion, said reduced diameter bore portion terminating in an axially innermost annular wall spaced from said annular wall separating said reduced diameter bore portion and said enlarged diameter bore portion and said hose disposed on said barrel with said hose end disposed in said hose receiving bore,
    said tube is disposed in said tube receiving bore with said free end of said tube in said reduced diameter bore portion in contact with said innermost annular wall portion and said upset is spaced from said radial annular wall separating said reduced diameter bore portion and said enlarged diameter bore portion and said upset disposed in said enlarged diameter bore portion and a seal member is disposed about said cylindrical surface of said tube between said radial annular wall and said upset; wherein said hose receiving bore of said coupling body includes an annular wall surrounding said barrel and said tube reviving end includes a reduced diameter annular wall portion adjacent said tube receiving end, said annular wall of said hose end of said coupling is crimped onto said hose and said reduced diameter wall portion at said tube end is crimped onto said tube.

2. A connector coupling as claimed in claim 1 wherein said outer cylindrical surface of said tube is secured in said reduced diameter bore portion by interference fit.

3. A connector coupling as claimed in claim 1 wherein said tube is restrained from axial movement between said crimp and said innermost annular wall portion.

4. A connector coupling as claimed in claim 3 wherein said coupling includes an annular spacer surrounding said outer cylindrical surface of said tube intermediate said seal member and said tube upset.

5. A connector coupling as claimed in claim 4 wherein a second seal member is disposed on said tube between said upset and said crimp of said reduced diameter annular wall portion of said body.

6. A connector coupling as claimed in claim 5 wherein said seal members are O-ring seals.

7. A connector coupling as claimed in claim 1 wherein said seal member is an O-ring seal.

8. A connector coupling connecting a flexible hose to a rigid metal tube in fluid communication comprising:

a hollow flexible hose having an end;

a rigid metallic tube having a free end, an unset spaced from said free end, and an outer cylindrical surface extending between said free end and said upset:

said coupling having a body comprising:

a hose end defining a hose receiving bore, a tube end defining a tube receiving bore, a hollow barrel in said hose receiving bore, said tube receiving bore including, an enlarged diameter bore portion adjacent said tube receiving end, a reduced diameter bore portion inward of said enlarged diameter bore portion and in fluid communication with said hollow barrel, and said hose disposed on said barrel with said hose end disposed in said hose receiving bore, said tube is disposed in said tube receiving bore with said free end in said reduced diameter bore portion with said outer cylindrical surface secured therein by interference fit, and said upset disposed in said enlarged diameter bore portion wherein said hose receiving bore of said coupling body includes an annular wall surrounding said barrel and said tube receiving end includes a reduced diameter annular wall portion adjacent said tube receiving end, said annular wall of said hose end of said coupling is crimped onto said hose and said reduced diameter wall portion at said tube end is crimped onto said tube.

9. A connector coupling as claimed in claim 8 wherein said coupling includes a radial annular wall separating said reduced diameter bore portion and said enlarged diameter bore portion.

10. A connector coupling as claimed in claim 9 wherein said enlarged diameter bore portion is sized to receive said upset on said tube.

11. A connector coupling as claimed in claim 9 wherein said reduced diameter bore portion terminates in an axially innermost annular wall spaced from said annular wall separating said reduced diameter bore portion and said enlarged diameter bore portion and said tube end is in contact with said innermost annular wall portion.

12. A connector coupling as claimed in claim 11 wherein said tube is restrained from axial movement between said crimp and said innermost annular wall portion.

13. A connector coupling as claimed in claim 11 wherein the length of said reduced diameter bore portion from said axially innermost annular wall portion to said annular wall portion is less than the distance from the free end of the tube to said upset and said coupling includes a seal member disposed on said tube between said annular wall and said upset.

14. A connector coupling as claimed in claim 13 wherein said coupling includes an annular spacer surrounding said outer cylindrical surface of said tube intermediate said seal member and said tube upset.

15. A connector coupling as claimed in claim 14 wherein a second seal member is disposed on said tube between said upset and said crimp of said reduced diameter annular wall portion of said body.

16. A connector coupling as claimed in claim 15 wherein said seal members are O-ring seals.

17. A connector coupling as claimed in claim 14 wherein said seal member is an O-ring seal.

* * * * *

UNITED STATES PATENT AND TRADEMARK OFFICE
CERTIFICATE OF CORRECTION

PATENT NO. : 7,530,604 B2  
APPLICATION NO. : 11/748774  
DATED : May 12, 2009  
INVENTOR(S) : Jim Kerin et al.

Page 1 of 1

It is certified that error appears in the above-identified patent and that said Letters Patent is hereby corrected as shown below:

<u>Claim 1</u>  
Line 8, change "reviving" to --receiving--

<u>Claim 8</u>  
Line 35, change "unset" to --upset--

Signed and Sealed this

Seventh Day of July, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,530,604 B2 | Page 1 of 1 |
| APPLICATION NO. | : 11/748774 | |
| DATED | : May 12, 2009 | |
| INVENTOR(S) | : Jim Kerin et al. | |

It is certified that error appears in the above-identified patent and that said Letters Patent is hereby corrected as shown below:

<u>Column 5, Claim 1</u>
Line 8, change "reviving" to --receiving--

<u>Column 5, Claim 8</u>
Line 35, change "unset" to --upset--

This certificate supersedes the Certificate of Correction issued July 7, 2009.

Signed and Sealed this

Fourth Day of August, 2009

JOHN DOLL
*Acting Director of the United States Patent and Trademark Office*